United States Patent [19]

Capowski

[11] Patent Number: 4,736,330

[45] Date of Patent: Apr. 5, 1988

[54] COMPUTER GRAPHICS DISPLAY PROCESSOR FOR GENERATING DYNAMIC REFRESHED VECTOR IMAGES

[76] Inventor: Joseph J. Capowski, 408 Coolidge St., Chapel Hill, N.C. 27514

[21] Appl. No.: 646,662

[22] Filed: Sep. 4, 1984

[51] Int. Cl.[4] ........................ G06F 15/40; G09G 1/06; G06K 9/32

[52] U.S. Cl. ........................ 364/518; 340/724; 382/44; 364/521

[58] Field of Search ........................ 364/518, 521, 424; 340/724, 726; 382/44, 45

[56] References Cited

U.S. PATENT DOCUMENTS

| | | | |
|---|---|---|---|
| 3,422,418 | 1/1969 | Simoneau | 340/709 X |
| 3,482,086 | 12/1969 | Caswell | 235/189 |
| 3,593,310 | 8/1971 | Kievit | 340/726 |
| 3,638,214 | 6/1972 | Scott et al. | 340/324 A |
| 3,746,912 | 7/1983 | Redecker et al. | 15/26 |
| 3,763,365 | 10/1973 | Seitz | 235/156 |
| 3,772,563 | 11/1973 | Hasenbalg | 315/23 |
| 3,787,666 | 1/1974 | Schumann et al. | 364/518 |
| 3,869,085 | 3/1975 | Green | 235/198 |
| 3,996,673 | 12/1976 | Vorst et al. | 35/10.2 |
| 4,027,148 | 5/1977 | Rosenthal | 235/198 |
| 4,074,359 | 2/1978 | Hasenbalg | 364/521 |
| 4,192,004 | 3/1980 | Buerger | 364/518 X |
| 4,357,671 | 11/1982 | Miller | 364/518 |
| 4,365,305 | 12/1982 | MacDonald et al. | 364/521 |
| 4,504,913 | 3/1985 | Miura et al. | 364/424 X |
| 4,511,973 | 4/1985 | Miura et al. | 364/424 X |
| 4,513,377 | 4/1985 | Hasebe | 364/424 X |
| 4,527,155 | 7/1985 | Yamaki et al. | 340/724 X |
| 4,553,214 | 11/1985 | Dettmer | 364/521 |

OTHER PUBLICATIONS

Capowski, "Characteristics of a Neuroscience Computer's Graphics Displays and a Proposed System to Generate Those Displays", Computer Graphics, 10:2, 1976, pp. 257-261.

Capowski, "The Neuroscience Display Processor", Computer, 11:11, 1978, pp. 48-58.

Capowski, "The Neuroscience Display Processor Model 2", Proceedings of the Digital Equipment Users Society, 5:2, 1978, pp. 763-767.

Capowski and Sedivec, "Accurate Computer Reconstruction and Graphics Display of Complex Neurons Using State of the Art Interactive Techniques, Comp. Biomed. Res., 14:518 532, 1981.

McInroy and Capowski, "A Graphic Subroutine Package for the Neuroscience Display Processor", Computer Graphics, 11:1, 1977, pp. 1-12.

*Primary Examiner*—Errol A. Krass
*Assistant Examiner*—Joseph L. Dixon
*Attorney, Agent, or Firm*—Foley & Lardner

[57] ABSTRACT

A low cost vector graphics display processor is capable of being operated by a relatively small processor. Indicia of a predetermined sequence of endpoints defining a figure, and move/draw indicia indicative of connections in the figure between successive endpoints are stored in a coordinate memory. Drive signals for display are generated in accordance with the contents of respective position counters. The contents of current position counters are selectively varied from values corresponding to a second successive endpoint in accordance with the move/draw indicia in a gradual manner to generate drive signals to draw a line between the first and second endpoints or to effect a move on the display without generating a line.

35 Claims, 7 Drawing Sheets

COMPUTER GRAPHICS DISPLAY PROCESSOR FOR GENERATING DYNAMIC REFRESHED VECTOR IMAGES

BACKGROUND OF THE INVENTION

The present invention relates to Vector Graphics Display Processors.

A Vector Graphics Display Processor is a special purpose computer which converts stored numerical information into a graphical display on a cathode ray tube (CRT). In general, the coordinates of the endpoints of the respective straight lines comprising an image are stored in coordinate memory within the Display Processor. The endpoint coordinates are typically X, Y coordinates for two dimensional images and X, Y, Z coordinates for three dimensional images. The coordinates are sequentially fetched from memory and passed to the Vector Graphics Display Processor, which includes a line generator device for generating respective voltage ramps from the previous X coordinate to the current X coordinate and from the previous to the current Y coordinate. Such ramps are applied as drive signals to the deflection amplifiers of a standard CRT. Thus, a complex image can be drawn from a series of short straight lines.

It should be noted that such a Vector Display Processor develops the image by moving the electron beam within the CRT only to those places on the screen where a line is being generated. This is to be distinguished from a raster scan image in which the entire CRT screen is scanned by the electron beam in a regular pattern regardless of what information is being displayed.

When the electron beam strikes the face of the CRT, the point of impingement is illuminated for a few milliseconds. To ensure that a continuous image is perceived on the screen by an observer, the electron beam must retrace or refresh the entire image on the order of 35 times per second. If the entire image is drawn less frequently, the image will appear to flicker. If the image is moved slightly each time it is redrawn, a smooth movement of the image will be perceived by the observer. Accordingly, special purpose computing hardware is typically included in the display processor, interposed between the coordinate memory and the line generator to selectively modify the coordinate values fetched from memory prior to application to the line generator. In this manner, a dynamic image can be presented to the observer. The special purpose computing hardware typically performs a mathematical transformation such as rotation, translation, and scaling of an image.

In general, dynamic refreshed Vector Graphics Display Processors in the form of peripheral devices adapted for cooperation with a general purpose (host) computer are known. Examples of devices for vector generation are described in U.S. Pat. Nos. 3,482,086 issued on Dec. 2, 1969 to C. F. Caswell; 3,638,214 issued to Scott et al. on June 25, 1972; 3,746,912 issued to Redecker et al. on July 17, 1983; 3,772,563 issued to R. D. Hasenbalg on Nov. 13, 1973; 3,869,085 issued to P. F. Green on Mar. 4, 1975; 3,996,673 issued to C. J. Vorst et al. on Dec. 14, 1976; 4,027,148 issued to R. D. Rosenthal on May 31, 1977; 4,074,359 issued to R. D. Hazenbalg on Feb. 14, 1978; and 4,365,305 issued to J. P. MacDonald et al. on Dec. 21, 1982. Special purpose hardware for performing the mathematic translations on the data prior to line generation is also known. An example is described in U.S. Pat. No. 3,763,365 issued Oct. 2, 1973 to C. L. Seitz. Such vector graphics display units, however, tend to be relatively expensive.

Low cost hardwired special purpose graphics processors have been developed for particular applications, such as, for example, the field of neuroscience. Description of special purpose hardwired Graphics Display Processors as used in neuroscience are described in the following articles, which are incorporated herein by reference: Capowski, "Characteristics of a Neuroscience Computer's Graphics Displays and a Proposed System to Generate Those Displays", Computer Graphics 10: 2, 1976, pp. 257-261; Capowski, "The Neuroscience Display Processor", Computer 11: 11, 1978 pp. 48-58; Capowski, "The Neuroscience Display Processor Model 2", Proceedings of the Digital Equipment Users Society, 5: 2, 1978 pp. 763-767; Capowski and Sedivec, "Accurate Computer Reconstruction and Graphics Display of Complex Neurons Using State of The Art Interactive Techniques", Comp. Biomed Res 14: 518-532, 1981; and McInroy and Capowski, "A Graphic Subroutine Package For The Neuroscience Display Processor", Computer Graphics 11: 1, 1977, pp. 1-12.

Such special applications vector graphics display processors, however, tend to be relatively complex, slow, and require a relatively complex and costly host computer.

SUMMARY OF THE INVENTION

The present invention provides a low cost vector graphics display processor capable of being driven by a relatively small processor (host computer).

Indicia of predetermined sequence of endpoints defining a figure, and move/draw indicia indicative of connections in the figure between successive endpoints are stored in a coordinate memory. Drive signals for a display are generated in accordance with the contents of respective position counters. In accordance with the value of the move/draw indicia, the contents of current position counters are selectively varied from values corresponding to a first endpoint to values corresponding to a second successive endpoint in a gradual manner to effect generation of drive signals corresponding to a line between the first and second endpoints, or the current position counters are loaded with values corresponding to the second endpoint, thus effecting a move on the display without generating a human perceivable line.

In accordance with another aspect of the present invention, indicia of a transformation matrix are stored and utilized to provide indicia of transformed coordinates in respect of the endpoints. The transformed coordinate indicia are utilized in the place of the original coordinates of the endpoints in generating the display.

In accordance with another aspect of the present invention, a CPU capable of calculating an arithmetic result and sensing the sign of the result in the same CPU state is utilized to facilitate extremely rapid line generation. Further, the line generation is effected with a minimum of operations.

BRIEF DESCRIPTION OF THE DRAWINGS

A preferred exemplary embodiment will hereinafter be described in conjunction with the appended drawing wherein like designations denote like elements and.

DETAILED DESCRIPTION OF THE PREFERRED EXEMPLARY EMBODIMENT

Figure 1:
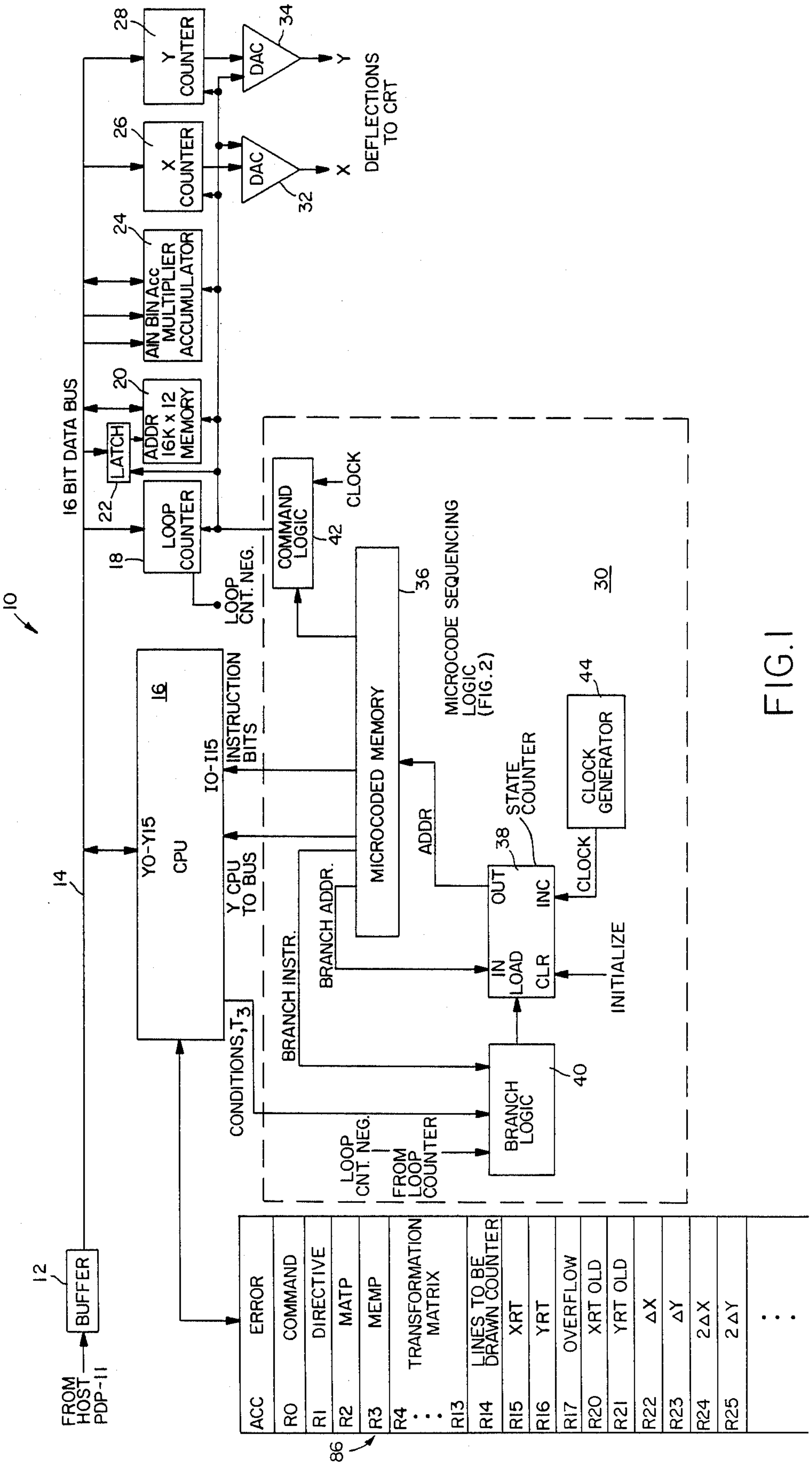
FIG. 1 is a schematic block diagram of a Vector Graphics Display system in accordance with the present invention.

Referring now to FIG. 1, a Vector Graphics Display system 10 in accordance with the present invention will be described. A suitable 16 bit buffer 12 couples a conventional 16 bit bus 14 to a suitable host computer such as a Digital Equipment Corporation PDP-11 (not shown). Buffer 12, suitably comprises, for example, two 74LS244 Texas Instruments Octal Buffer integrated circuts. Bus 14 operatively interconnects a conventional 16 bit bipolar CPU 16; a 12 bit counter 18 (hereinafter loop counter 18); a 16K by 12 bit random access memory 20 (hereinafter coordinate memory 20); a suitable latch 22 (hereinafter address latch 22) cooperating with coordinate memory 20; a conventional multiplier-accumulator 24 and respective counters 26 and 28. CPU 16, loop counter 18, memory 20, multiplier-accumulator 24 and counters 26 and 28 all are controlled and coordinated by suitable microcode sequencing logic 30 (as will hereinafter be described). CPU 16 also communicates with a number of randomly accessible registers (collectively indicated as 17). In practice, registers 17 are suitably integral to CPU 16, i.e., are integrated within the CPU chip.

CPU 16 coordinates operation of system 10, by effecting logical and arithmetic operations in accordance with microcode instructions provided by sequencing logic 30. CPU 16 suitably comprises an Advanced Micro Devices 29116 CPU integrated circuit, capable of executing any one of a plurality of predetermined instructions in a time on the order of 100 nanoseconds. CPU 16 includes respective input/output data terminals Y0–Y15, instruction input terminals I0–I15, a command input terminal receptive of command signals (*CPUTOBUS) respecting communication between CPU 16 and BUS 14, respective output terminals (CONDITION, T3) providing indicia of the results of an operation (logical or arithmatic) performed by CPU 16. Input/output data terminals (Y0–Y15) are coupled to the respective lines of DATABUS 14. Instruction input terminals (I0–I15), command input terminal (*CPUTOBUS), and the condition output terminals (CONDITION, T3) are coupled to microcode sequencer, memory and command logic 30.

Microcode sequencing logic 30 suitably comprises a permanent read-only memory 36 (hereinafter microcode memory 36), a counter 38 (hereinafter state counter 38), suitable branch logic 40, command logic 42 and clock generator 44. Briefly, microcode memory 36 contains a microcode program which defines the operation of system 10. In accordance with the microcode program, microcode memory 36 selectively provides instructions to CPU 16 and, in conjunction with command logic 42, operational commands to loop counter 18, coordinate memory 20, multiplier-accumulator 24, counters 26 and 28, and DACS 32 and 34. The execution sequence of the respective microcode instructions is controlled by the contents of state counter 38. State counter 38 is typically incremented by clock generator 44 at a rate commensurate with the instruction execution time of CPU 16. However, branching to predetermined locations within microcode memory 36 can be effected under predetermined conditions as detected by branch logic 40. "Branching" is effected by loading, in parallel, the address of the designated "branch" location into state counter 38. Microcode logic 30 will hereinafter be more fully described in conjunction with FIG. 2.

Loop counter 18 is utilized in the line drawing process. As will hereinafter be explained, indicia of the desired length of the line along its X or Y axis, whichever is larger, is loaded into loop counter 18 and, decremented during the line drawing process. Loop counter 18 suitably comprises a 12 bit counter having 12 parallel input terminals, "increment" and "parallel load" command input terminals and "sign" output terminal (Qd), formed of, for example, three Texas Instruments 74193 up/down 4 bit counters integrated circuits. The respective input terminals of the counter 18 are connected to the 12 least significant bits of BUS 14. The increment and parallel load command terminals are receptive of command signals (INCLOOPCTR) and (*TAKELOOPCTR) respectively, from sequencing logic 30 to selectively effect incrementing and parallel load of the loop counter from BUS 14. Loop counter 18 provides at terminal Qd an output signal LOOPCNTNEG, indicative of the sign of the contents of the loop counter, for application to branch logic 40.

Coordinate memory 20 is utilized to store the coordinates of the endpoints of the respective lines comprising the figure to be drawn. Specifically, coordinate memory 20 contains, e.g., 16,384 consecutive 12 bit words (locations), organized linearly, into successive records, each corresponding to an endpoint. The order of the records in coordinate memory 20 corresponds to the sequence of the points within the figure. Each endpoint record is formed of four successive 12 bit words, representing X, Y and Z values and a "move-draw" bit, respectively. The move-draw bit dictates whether or not a line exists in the figure between the previous and the present endpoint or whether the electron beam should move from the previous endpoint to the present endpoint without perceivably illuminating the screen. Coordinate memory 20 is suitably formed of twelve 16K×1 Fujitsu 8167A-55 static random access memory (RAM) chips. The data input/output terminal of each of the chips is coupled to a respective line of DATABUS 14 (the 12 least significant lines). Coordinate memory 20 is suitably sign extended to facilitate cooperation with 16 bit data bus 14 utilizing a 4 bit buffer such as a 74126 integrated circuit, with the data inputs thereof coupled in common to the DATA PORT of the most significant bit of the RAM's and the four output terminals thereof respectively coupled to the four most significant bit lines of DATABUS 14.

Coordinate memory 20 is responsive to respective control signals from microcode logic 30: *SELECTMEMORY, to enable the data input/output port of the memory (e.g., initiate outputting the data stored in the designated (address) location onto DATABUS 14); and *WRITEINTOMEMORY to effect loading of the data on bus 14 into the designated (address) memory location.

The respective locations in coordinate memory 20 are addressed in accordance with the contents of latch 22. Specifically, the output terminals of latch 22 are coupled to the address terminals of coordinate memory 20. The input terminals of latch 22 are coupled to the 14 least significant bits of DATABUS 14. Latch 22 is suitably formed of two Texas Instruments 74273 octal flip-flop integrated circuits. Latch 22 captures (temporarily stores) the address supplied on DATABUS 14 in response to a control signal (TAKEMEMADDRLATCH) from microcode logic 30.

In practice, loading or reading out the respective locations of coordinate memory 20 is a two step process. The location (address) is first supplied on DATABUS 14 and temporarily stored in latch 22. In the next successive cycle, the data is loaded into or read out of the location in coordinate memory 20 specified by the address stored in latch 22.

Multiplier accumulator 24 is utilized to provide an expedited matrix multiplication of the respective coordinate data in memory 20 times a transformation matrix stored in registers 17 (R4–R13). Specifically, multiplier-accumulator 24 performs, in digital logic, one elementary function of a matrix multiplication (ACC=ACC+A times B.). The function is suitably performed in on the order of 85 nanoseconds. Multiplier-accumulator 24 is suitably a TRW TDC 1009J multiplier-accumulator having A and B data input terminals, accumulated sum output terminals, and respective control input terminals in respect of loading the A and B data, effecting the multiplication/accumulation operation, clearing the accumulated sum, and outputting the accumulated sum. The A and B input terminals and are each coupled to the 12 least significant bits of DATABUS 14. Accumulated sum data output terminals are similarly coupled to DATABUS 14. The respective control input terminals of multiplier accumulator 24 are receptive of respective control signals from sequencing logic 30 (TAKEMACA) (to effect loading of the A value); (TAKEMACB) (to load the B value); (TAKEPROD) (to effect calculation of the product and accumulation); (*NONACCUM) (to selectively effect multiplication without accumulation, i.e., clears the former accumulation); and (*PRODTOBUS) (to effect outputting of the accumulated product onto BUS 14).

X counter 26 and Y counter 28 are utilized to store indicia of the current CRT beam position. The contents of X counter 26 and Y counter 28 are converted into deflection signals for ultimate application to the CRT by digital to analog converters 32 and 34 respectively. The contents of counters 26 and 28 are varied to alter the position of the CRT beam. Counters 26 and 28 each comprise 12 bit counters, capable of storing a range of numbers from −2048 to +2047, though only numbers of range −1024 through +1023 will be stored. The parallel input terminals of each of X counter 26 and Y counter 28 are connected to the 12 least significant bits of BUS 14. X counter 26 is receptive of respective control signals from sequencing logic 30 (*TAKEXCTR, *DECXCTR, *INCXCTR) for effecting loading of the counter from DATABUS 14, decrementing the counter and incrementing the counter. Y counter 28 is similarly responsive to corresponding control signals (*TAKEYCTR, *DECYCTR, *INCYCTR), from sequencing logic 30. A suitable X counter 26 or Y counter 28 may be formed of three Texas Instruments 74193 up-down counter integrated circuits. The parallel output terminals of counters 26 and 28 are coupled to digital to analog converters 32 and 34 respectively. DAC's 32 and 34 convert the digital values in counters 26 and 28 into analog signals appropriate for ultimate application as deflection signals for the display CRT. DAC's 32 and 34 each suitably comprise deglitched 12 bit digital to analog converters, such as an Analog Devices HDD-1206 including 12 data input terminals, an analog output terminal and a capture data command input terminal. The 11 most significant bits of the digital to analog converters 32 and 34 are coupled to the 11 least significant output terminals of the counters 26 and 28. The least significant input bit of each digital-to-analog converter is grounded. An inverter is interposed to operate on the most significant bit to generate offset binary data to accomodate the DAC. Where DAC's which operate on two's complement data are employed (for example, a DATEL DG12B2 DAC), such an inverter would not be utilized. Both DAC's 32 and 34 are receptive of a command signal (TAKEDACS) from sequencing logic 30 to effect capture of the contents of X counter 26 and Y counter 28 by the DAC's.

Figures 1, 2:
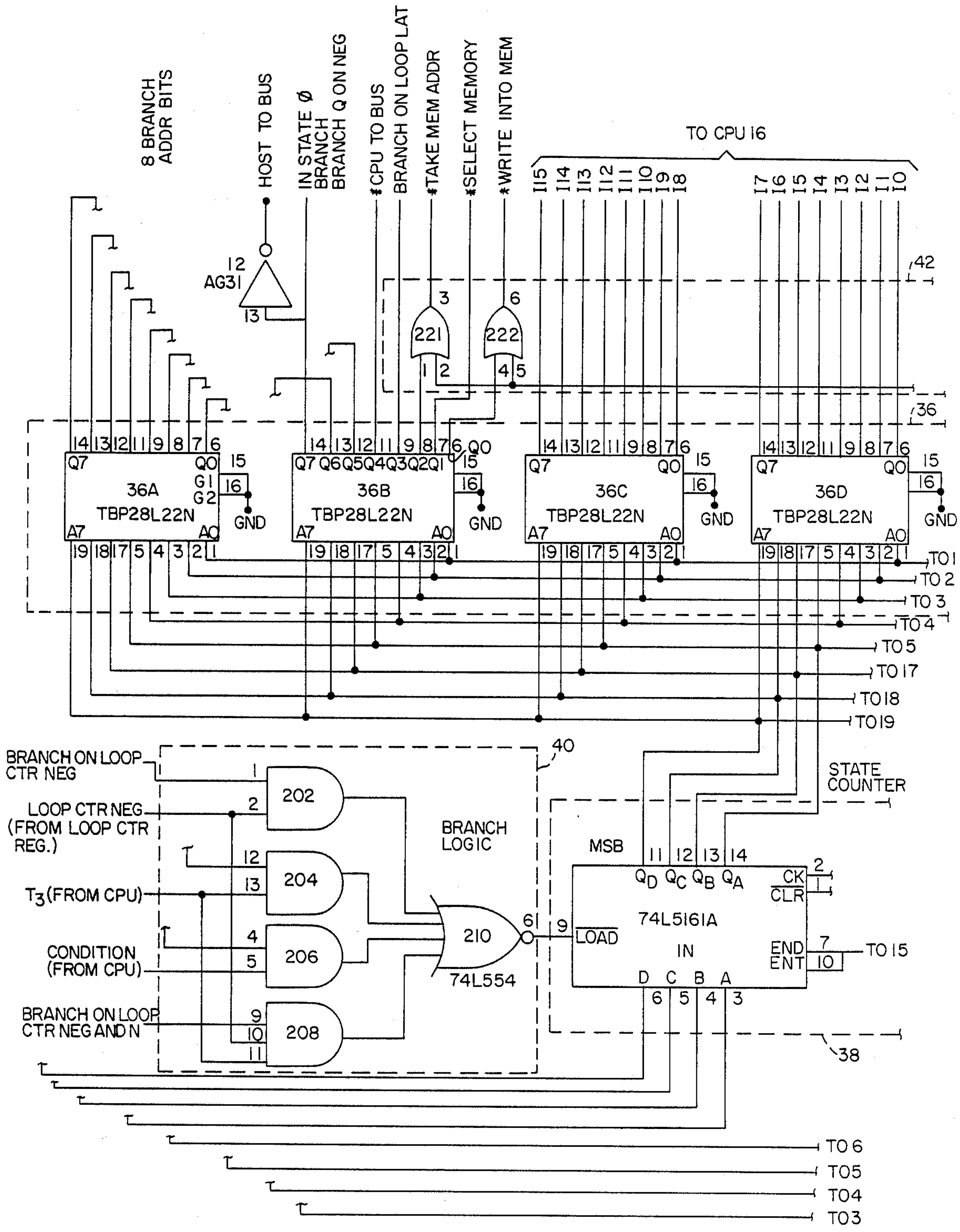
FIG. 2 (2-1 and 2-2) is a more detailed block schematic of a microcode sequencer and memory.
Figure 2:
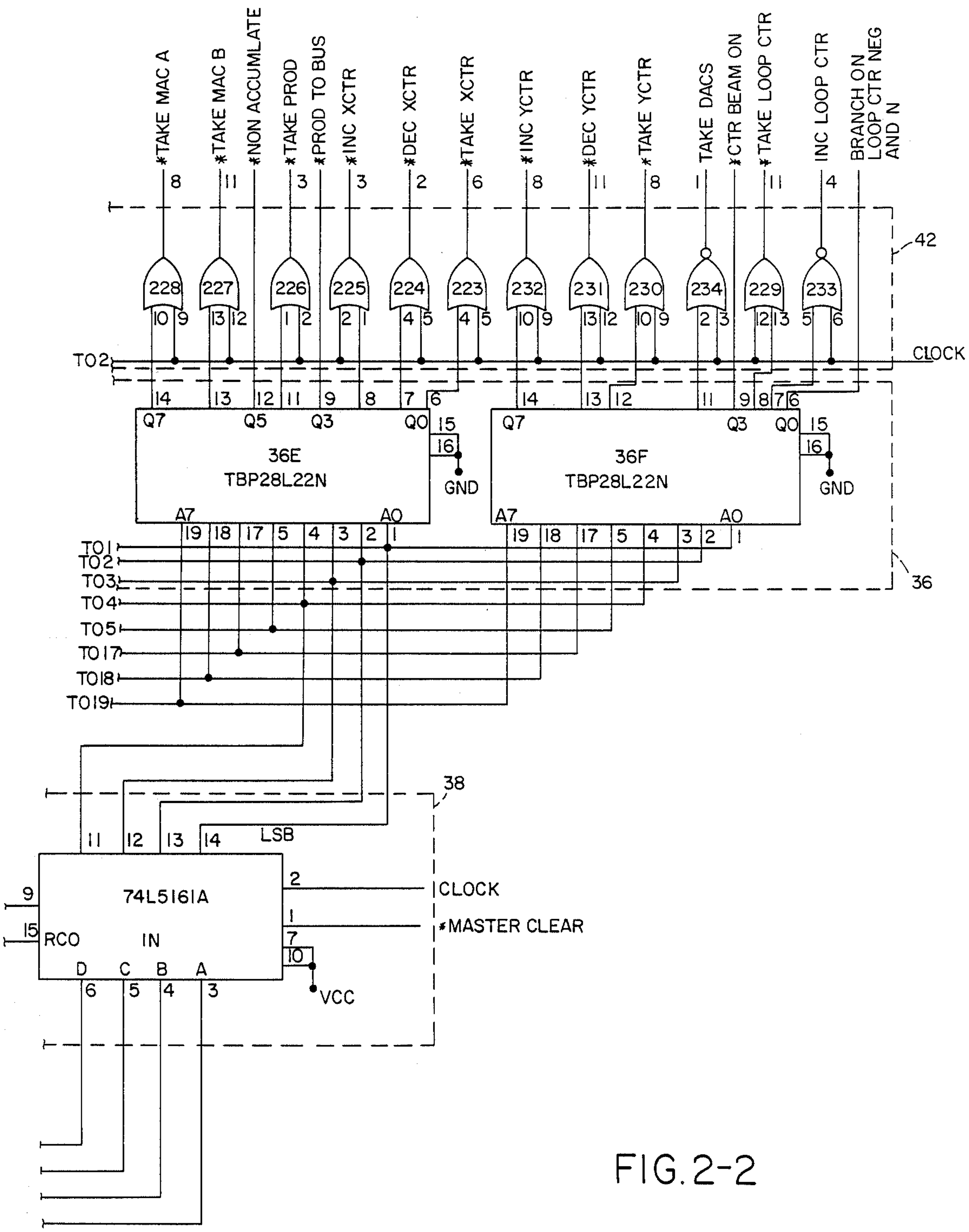

Referring now to FIG. 2, sequencing logic 30 will be more fully described.

Microcode memory 36 is utilized to store the respective microcode instructions used to sequence and control the operation of system 10. Microcode memory 36 suitably comprises six programmable read only memory (PROM) integrated circuits 36A–36F. PROMS 36A–36F may comprise, for example, Texas Instruments TBP28L22N bipolar PROMS, including eight address input terminals (A0–A7) and eight data output terminals (Q0–Q7). Signals indicative of the contents (i.e., the microinstruction word) of the memory location designated by the signals applied to the address input terminals A0–A7 are provided at the data output terminals (Q0–Q7).

Each microinstruction word is 48 bits in length, including a sixteen bit microinstruction to CPU 16, twenty control bits for the various devices in system 10, a four bit branch command (e.g., four command signals relating to branching) and, an eight bit branch address. More specifically, the output terminals Q0–Q7 of each of PROMS 36C and 36D are applied to the instruction input terminals I0–I15 of CPU 16. The eight output bits (Q0–Q7) of PROM 36A are applied as input signals to the parallel input terminals of state counter 38. The remainder of the PROM output terminals in cooperation with control logic 42, provide control signals to the various other elements of system 10. The respective control signals will be hereinafter described in conjunction with the operation of system 10.

Control logic 42 comprises a plurality of two input OR gates 221–232 and two input NOR gates 233, 234, each coupled at one terminal to a respective PROM output terminal and at the other to clock generator 44 (FIG. 1). Control logic 42 facilitates proper relative timing of the respective control signals. More specifically, control logic 42 accommodates use of devices that are responsive to positive going transitions and devices responsive to negative going transitions. For example, OR gates 221–232 provide command signals to devices sensitive to positive going transitions and NOR gates 233, 234 provide command signals to devices sensitive to negative going transitions. Further, by gating the respective microcode bit with the clock signal, a transition is ensured during each state that the microcode bit is high, even when there would not otherwise have been a transition, due to the existence of a preceding state wherein the bit was high.

The actual sequencing (addressing) of the microcode instructions is controlled by the contents of state counter 38. State counter 38 suitably comprises two Texas Instruments 74LS161A 4 bit counter integrated circuits, and includes parallel data input terminals, parallel data output terminals, and clock, load, and clear control terminals. The output terminals of state counter 38 are respectively coupled to the individual address lines of PROMS 36A-36F. The parallel data input terminals of state counter 38 are connected to the respective output terminals Q0-Q7 of PROM 36A, i.e., are receptive of indicia of a branch address from the microcode instruction word. However, such branch address is loaded into state counter 38 only in response to a signal applied to the load terminal of counter 38 from branch logic 40.

Branch logic 40 suitably comprises respective 2 input AND gates 202, 204, and 206, a 3 input AND gate 208 and a 4 input NOR gate 210. Two input AND gate 202 is responsive to a BRANCHONLOOPCTRNEG command signal from the Q3 terminal of PROM 36B, and a LOOPCTRNEG control signal generated by loop counter 18. Two input AND gate 204 is responsive to a BRANCHQONNEG command signal from the Q5 output terminal of PROM 36B and the T3 condition signal from CPU 16. The T3 condition signal is provided by CPU 16 and indicates whether the result of the current arithmetic operation is negative. Two input AND gate 206 is responsive to the branch command signal from the Q6 output terminal of PROM 36B, and the condition signal from CPU 16. Three input AND gate 208 is responsive to the LOOPCTRNEG, the T3 output signal from CPU 16 and the BRANCHONLOOPCTRNEGANDN from the Q0 output of PROM 36F. Thus, branching (loading the designated branch address into the state counter 38) is effected upon any of the following conditions:

(1) When the BRANCHONLOOPCTRNEG bit in the microcode is set and the loop counter 18 contains a negative number (branch on loop counter negative, AND gate 202);

(2) When the BRANCHQONNEG bit in the microcode is set and the arithmetic operation performed in the CPU 16 during the current microcode sequence state has a negative result (branch quickly on negative, AND gate 204);

(3) When the BRANCH bit in the microcode is set and a suitable TEST instruction is provided to the CPU 16 to provide a high CONDITION output (normal arithmetic or unconditional branch, AND gate 206): for example, ADD two numbers together and, in the next state, BGE (branch if the result is greater than or equal to zero). An unconditional branch is forced by testing a bit in one of the CPU registers 17 which is maintained in a predetermined condition, e.g., set;

(4) When the BRANCHONLOOPCTRNEGANDN bit in the microcode is set and the loop counter 18 contains a negative number and the arithmetic operation performed in the CPU 16 during the current microcode sequence state has a negative result (branch on loop counter negative and N, AND gate 208).

Figure 3:
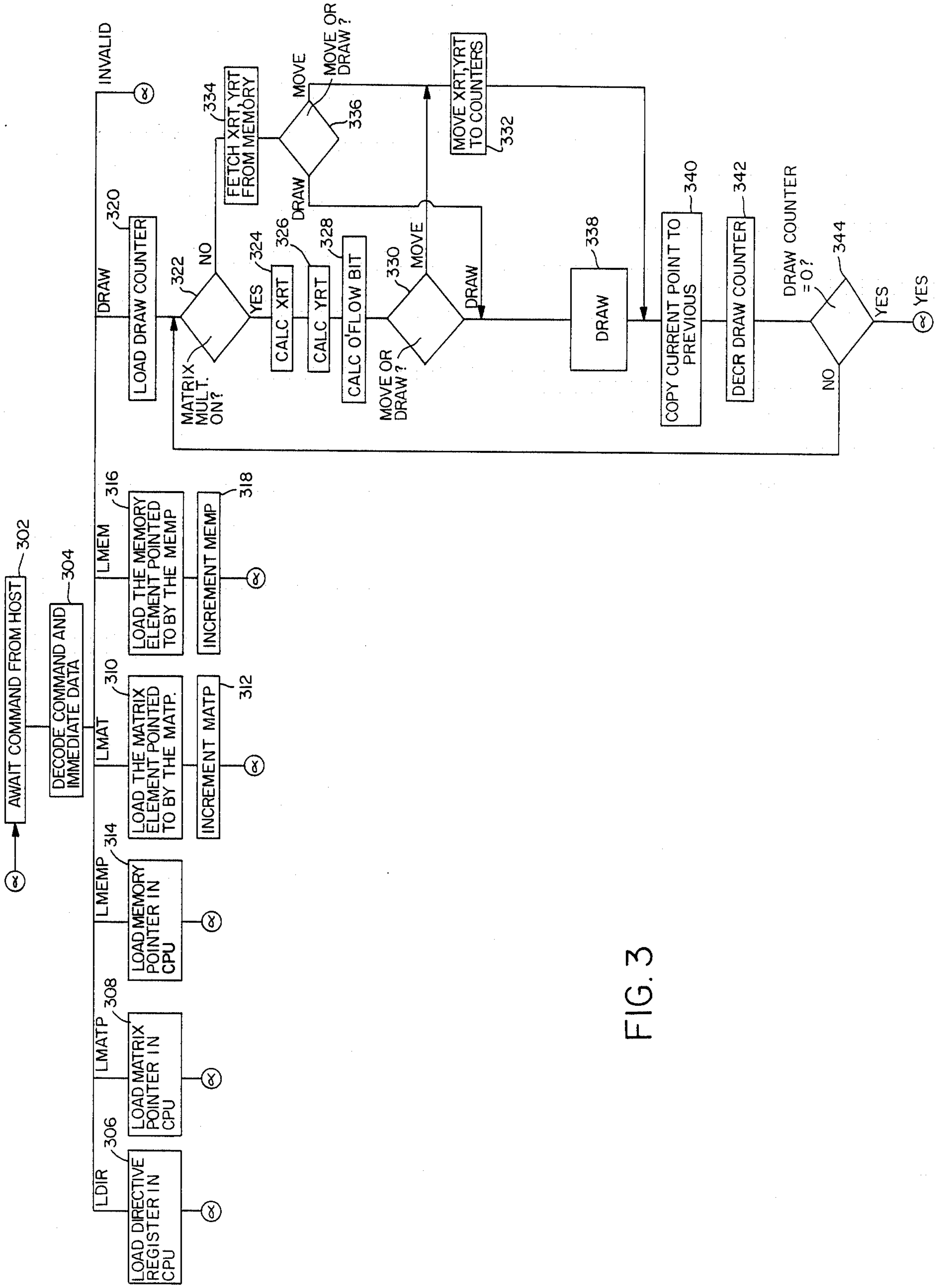
FIG. 3 is a flow chart of the microcode in accordance with the present invention.

Referring now to FIGS. 1, 2 and 3, the operation of system 10 will be described. In general, basic data defining a figure is communicated to system 10 from the host computer, and stored in coordinate memory 20. The figure is defined by a series of sequential coordinates representing the endpoints of lines (X,Y for two dimensional images; X, Y, Z for three dimensional images) and the presence or absence of a connection (line) between successive endpoint coordinates. Thus, the figure is composed of a series of "moves" (whereby the electron beam of the CRT is moved from the previous coordinate to the specified coordinate without generating a perceivable line); and "draws" (whereby a straight line is generated on the screen from the previous position to the specified position). As previously noted, each coordinate is represented by a record comprising respective 12 bit X, Y and Z values and a move/draw bit. If a display is two dimensional, the Z values are usually zero.

Assuming a two dimensional untransformed image is to be generated, the image is drawn on the display in response to a "draw" instruction from host computer to system 10. System 10 then extracts the respective endpoint records from coordinate memory 20, in sequence, and effects a move or draw between successive endpoints.

When a three dimensional transformed image is to be generated, the elements of a transformation matrix are also provided by the host computer. The transformation matrix is stored in registers R4–R13 of registers 17 associated with CPU 16. When a draw instruction is provided by the host computer, system 10 extracts each coordinate from coordinate memory 20, multiplies it times the transformation matrix (i.e., performs a matrix multiplication), then generates a line or effects a move in accordance with the transformed data. The most commonly used transformations are rotation, translation and scaling. However, any algebraic matrix manipulation can be performed.

To display a smoothly moving dynamic image, the normal sequence of operation is to load the data corresponding to the untransformed image into coordinate memory 20, and load a transformation matrix corresponding to the desired transformation into registers R4–13. The transformed image is then generated. A variant transformation matrix is then loaded into registers R4–R13 and the corresponding transformed figure is drawn. By making relatively slight changes in the transformation matrix between each consecutive refreshing of the image, the viewer perceives a smoothly changing image. For example, a transformation matrix that corresponds to rotating the structure by, for example, 15 degrees about its Y axis could be utilized for the first iteration, and rotation matrices corresponding to successively greater rotations, e.g., 16°, 17° . . . , utilized for successive iterations, to generate what is perceived as a smoothly rotating image.

During normal operation, system 10 is responsive to various commands from the host computer. System 10 initially receives an initialization pulse (Masterclear, FIG. 2; connections not shown in FIG. 1) from the host computer. State counter 38 is cleared and clock generator 44 is inhibited, so system 10 maintains a "waiting state" (STATE $\phi$) until a command is received from the host computer (FIG. 3, step 302).

The host commands are in the form of 16 bit words each composed of a four bit operation code (op code) identifying the command and a 12 bit immediate data value to be used during the execution of the command. When any command is received from the host, clock generator 44 is enabled and sequencing logic 30 causes the invention to execute sequentially the microcode stored in microcode memory 36. The last microcode instruction executed in respect of any command is a jump to STATE ϕ at which time the invention informs the host computer that it has completed the command and is awaiting a new command. (The initialization pulse likewise clears state counter 38 so that the sequence is begun at the beginning of the microcode, "STATE ϕ" in response to each command.)

The command from the host is initially loaded from data bus 14 into an accumulator register ACC (one of registers R17). The op code portion of the command is then loaded into a command register R0 (also one of the registers R17). The 12 bit immediate data field is, however, maintained in accumulator register ACC. The op code in register R0 is then decoded by sequentially comparing the contents of register R0 to indicia of respective host command op codes prestored in the microcode until a favorable comparison is obtained, then effecting a branch to the portion of the microcode corresponding to the particular operational code (step 304). If the contents of register R0 do not match one of the authorized operational codes, the host command is deemed invalid and system 10 returns to the waiting state (STATE ϕ) and awaits a new command.

The host computer provides 6 basic commands:

LDIR (load the directive register (R1);

LMATP (load the matrix pointer register (R2);

LMEMP (load the memory pointer register (R3);

LMAT (load the transformation matrix (R4–R13);

LMEM (load coordinate memory 20); and

DRAW (generate a sequence of lines and moves in accordance with a designated portion of the data previously loaded in coordinate memory 20, transformed, if indicated by the contents of directive register R1 per the contents of the transformation matrix R4–R13).

The LDIR host command is utilized to specify whether or not the data stored in coordinate memory 20 is to be transformed, i.e., multiplied by the transformation matrix in R4–R13, during the drawing process. The LDIR command includes the corresponding 4 bit operational code and an immediate data value indicative of whether or not matrix multiplication is to be effected. As previously noted, when the LDIR command is received, the operational code is loaded into command register R0 and the immediate data value retained in accumulator ACC. A branch is then effected to the first microcode command corresponding to the LDIR command (step 304). The immediate value data in accumulator ACC is then loaded into a directive register R1 (step 306). As will be explained, bit 1 of register R1 is tested during the draw sequence to determine whether or not to transform the figure defined by the contents of coordinate memory 20. After the contents of the accumulator are loaded into directive register R1, system 10 returns to the waiting state (step 302).

The LMATP and LMAT commands are utilized to load the transformation matrix into registers R4–R13. The LMATP command designates which of registers R4–R13 is to be loaded, and the LMAT command is used to effect loading of the data into the designated register. Specifically, the LMATP command word includes the corresponding operational code and an immediate data value corresponding to the address of a designated register R4–R13. As previously noted, during the decoding process, the operational code portion of the command is shifted into command register R0 and the immediate data value retained in accumulator ACC. When the LMATP command is detected, the address contained in accumulator ACC is loaded into the matrix pointer (MATP) register R2 (step 308). System 10 then returns to the waiting state (step 302).

The LMAT command includes the LMAT operational code and an immediate data value corresponding to a transformation matrix element value. When the operational code loaded into register R0 during the decoding process corresponds to the op code of the LMAT command, the matrix element value contained in accumulator ACC is loaded into the particular register R4–R13 designated by the address contained in the matrix pointer register R2 (step 310). Matrix pointer register R2 is then incremented (step 312).The system then reassumes the waiting state (step 302).

The LMEMP and LMEM commands are similarly used to load the coordinate data into coordinate memory 20. The host computer typically provides one LMEMP command followed by four (4) LMEM commands to load an endpoint record into coordinate memory 20. The LMEMP command word includes the LMEMP op code and an immediate data value corresponding to the 12 most significant bits of the address of a location in coordinate memory 20 (corresponding to the beginning of an endpoint record). Transmission of only the 12 most significant bits of the address (e.g., identifying the beginning of each record), then supplying the two least significant bits (identifying a particular word within the record) within system 10, permits total access to coordinate memory 20, notwithstanding a range of addresses requiring in excess of the 12 available immediate data bits in the command word. When the LMEMP op code is detected in register R0 during the decoding process, the contents of accumulator ACC are loaded into a memory pointer register R3 (step 314). The contents of Register R3 are then shifted two bits to the left, and the rightmost two bits are cleared to provide the address of the first word (ie., X coordinate) of the endpoint record identified by the twelve most significant bits.

The LMEM instruction causes the incoming data to be loaded into the memory location designated by the contents of memory pointer register R3, and then increments memory pointer register. The LMEM command word includes the LMEM operational code, and an immediate data value corresponding to one of an X-coordinate, Y-coordinate, Z-coordinate or move/draw bit, as appropriate. When the op code loaded into command register R0 corresponds to the LMEM op code, the contents of memory pointer register R3 are communicated to bus 14, and a command signal (*TAKEMEMADDRESS; NORGATE 221, FIG. 2) is generated to latch 22. Thus, the address from memory pointer register R3 is loaded into latch 22. NORGATE 221 provides an operative level transition in the *TAKEMEADDRESS control signal at the end of the clock pulse, assuring that the contents of the memory pointer R3 are established on bus 14 at the time latch 22 captures the data.

During the next clock cycle, the coordinate value (or move/draw bit) data in accumulator ACC is placed on bus 14, and, the *SELECTMEMORY (output Q1 of PROM 36B; FIG. 2) and *WRITEINTOMEMORY (OR gate 222, FIG. 2) command signals are generated. The operative transition of the *SELECTMEMORY signal in effect enables the input/output port of memory 20, and occurs at the beginning of the cycle, essentially concurrently with the communication of the contents of accumulator ACC to bus 14. The operative transition of the *WRITEINTOMEMORY control signal is thereafter generated (at the end of the clock pulse) causing the data on bus 14, i.e., data value from accumulator ACC, to be loaded into the memory location designated by the address stored in latch 22 (step 316).

On the next cycle, the contents of memory pointer register R3 is incremented (step 318). The system then returns to the await command state (step 302).

The DRAW command effects generation of drive signals to the CRT display corresponding to a designated portion of the contents of memory 20. The DRAW command word includes the DRAW op code, and a twelve bit immediate data value corresponding to the number of endpoints in the figure to be drawn. When the operational code placed in command register R0 corresponds to the DRAW op code, the negative of the coordinate count contained in accumulator ACC is loaded into a "number-of-lines-to-be-drawn" counter R14 in registers 17 (step 320). The contents of directive register R1 is then tested to determine whether or not a transformation is to be effected (step 322). If a predetermined bit (e.g., bit one) of directive register R1 is low, then no matrix multiplication is to be effected, and a branch is effected, as will be explained. If, however, bit one of directive register R1 is one, a matrix multiplication is indicated and the transformed (e.g., rotated and translated) X coordinate (XRT) and Y coordinate (YRT) are then calculated (steps 324, 326). In effect, the following matrix multiplication is performed by sequential application of the present X, Y and Z coordinate values from coordinate memory 20 and the transformation matrix values from registers R4–R13, to the A and B inputs of multiplier accumulator 24:

$$(XRT, YRT) = (X, Y, Z, 1) \times \begin{matrix} [R4][R10] \\ [R5][R11] \\ [R6][R12] \\ [R7][R13] \end{matrix}$$

Where XRT and YRT are the transformed coordinates, [R4], [R5] . . . [R13] represent the transformation matrix elements contained in registers R4, R5 . . . R13; and X, Y, Z are the X, Y and Z coordinates fetched from coordinate memory 20. In the preferred embodiment an orthographic projection is performed, accordingly, the rotated, translated Z coordinate is not calculated. However, if a perspective projection is desired, the calculation of the rotated Z coordinate would also be performed. In such case the transformation matrix would include a third column of elements. Translation is effect by storing the translation terms of the matrix as the fourth row ([R7], [R13]) and including a 1 as a fourth column in the coordinate matrix. The calculated XRT and YRT values are stored in respective registers R15 and R16.

More specifically, the transformed X coordinate is calculated by multiplying the matrix formed of the X-coordinate, Y-coordinate, Z-coordinate and a 1 (X, Y, Z, 1) times the first column of the transformation matrix. This is accomplished by first placing the contents of memory pointer register R3 on bus 14 then generating the *TAKEMEMADDRESS control signal (OR gate 221, FIG. 2) to latch 22, thus loading the address of the current memory location into latch 22. During the next operational cycle the *NONACCUMULATE control signal (output Q5 of PROM 36E, FIG. 2) is generated at the beginning of the clock pulse to, in effect, clear any previous accumulation in multiplier-accumulator 24. Memory pointer R3 is incremented, and the *SELECTMEMORY signal is generated to place the contents of the location designated by the address in latch 22 on data bus 14. At the end of the clock pulse operative transitions are generated in the *TAKEMACA command signal (OR gates 228, FIG. 2) causing the data value on bus 14 to be captured by the A input to multiplier-accumulator 24. Certain types of multiplier-accumulators such as the TRW TDC-1009J multiplier-accumulator require that the accumulate control may be loaded only when both the A value and B value are concurrently loaded. Accordingly, where such multiplier-accumulators are employed the *TAKEMACB control signal (OR gate 227, FIG. 2) would be generated concurrently with the *TAKEMACA signal to accommodate loading the accumulator input of multiplier-accumulator 24.

Thereafter, the transformation matrix element would be loaded and the product generated. More specifically, in the next successive cycle after the coordinate value is loaded into multiplier-accumulator 24, the contents of register R4 (the first element of the transformation matrix) is provided on bus 14 and the *TAKEMACB command signal generated to thus cause multiplier-accumulator 24 to capture the first transformation matrix element as its B input.

During the next cycle, the *TAKEPROD command signal (ORGATE 226, FIG. 2) is generated to cause multiplier-accumulator 24 to multiply the previously loaded X-coordinate and transformation matrix element (R11) without accumulation. During that same cycle, the contents of memory pointer R3 are provided on bus 14 and the *TAKEMEMORYADDRESS command signal (OR gate 221, FIG. 2) generated at the end of the cycle to thus load the address into latch 22. During the next cycle, the contents of memory pointer R3 is incremented, the Y-coordinate value in the memory location designated by the contents of latch 22 is placed on bus 14, and the *TAKEMACA and *TAKEMACB command signals are generated to load the Y value into multiplier-accumulator 24 A input. Again, because of the design of the multiplier-accumulator integrated circuit, the coordinate Y value must be loaded into the B input so that the accumulation control may be set for accumulation. The contents of transformation matrix register R5 (R21) is thereafter placed on bus 14 and the *TAKEMACB command signal generated to load the value into multiplier-accumulator 24.

During the next cycle, the *TAKEPROD command signal (OR gate 226, FIG. 2) is again generated to initiate the multiplication-accumulation process. The address in memory pointer R3 is also loaded into latch 22 in the manner noted above, to designate the Z-coordinate value in memory 20. The Z value in the designated memory location is then loaded into multiplier-accumulator 24. An operative transition is generated in the *SELECTMEMORY command signal (output Q1 of PROM 36B, FIG. 2), placing the Z-coordinate data on bus 14. An operative transition is thereafter generated in the *TAKEMACA command signal to multiplier-accumulator 24 causing multiplier-accumulator 24 to capture the Z value on data bus 14.

During the next operative cycle the contents of register R6 are supplied as a B-input to multiplier-accumulator 24.

The *TAKEPROD command signal (ORGATE 226, FIG. 2) is then generated to cause multiplier-accumulator 24 to effect the multiplication and accumulation process.

The 1 value and the contents of register R7 are then loaded as A and B inputs, respectively, into multiplier-accumulator 24.

An immediate data value corresponding to a 1 is placed on bus 14 concurrently with generation of the *TAKEPROD control signal. With the 1 value on bus 14, the *TAKEMACA command signal is generated, loading the "1" as an A input to multiplier-accumulator 24. Thereafter, during the next cycle the contents of R7 are placed on bus 14 and the *TAKEMACB signal generated. During the next cycle, the *TAKEPROD signal is generated to complete the multiplication-accumulation process with respect to the transformed X coordinate XRT. During the following cycle, register R15 is addressed, and the *PRODTOBUS signal generated (output Q3 of PROM 36E, FIG. 2) to load the XRT value in register R15. In order to increase (double) the speed of the line generation, an 11 bit (as opposed to 12 bit) resolution may be adopted, by arithmetically shifting the XRT value in register R15 one bit to the right to provide an 11 bit value. Degradation of the display is negligible with the present state of CRT's.

The contents of R3 are also adjusted to again correspond to the X coordinate, e.g., 2 is subtracted from the present contents. Thus, at the end of the calculation of XRT, memory pointer register R3 again designates the location of the same X coordinate.

A similar sequence of operations is then performed to calculate the transformed Y coordinate (YRT) by multiplying (X, Y, Z, 1) times the second column of the transformation matrix, i.e., the contents of registers R10–R13. After the matrix multiplication is performed by multiplier-accumulator 24, the calculated YRT value is loaded into a YRT register R16 and arithmetically shifted one bit to the right to provide an 11 bit value to facilitate the line generation process.

If a perspective projection were to be generated, the transformation matrix would include an additional column of values (not shown), a similar process would be effected to determine the transformed Z value, and the Z value stored in a designated register.

Upon completion of calculation of the transformed coordinates, memory pointer R3 designates the address of the move/draw bit associated with the endpoint.

After the transformed X and Y coordinates (XRT, YRT) are calculated, a test is performed to ensure that the coordinates are in fact within the coordinate range corresponding to the CRT screen (step 328). Specifically, a determination is made as to whether either the XRT or YRT value has exceeded the normal 11 bit, two's complement range −1024 to +1023. If either transformed coordinate is outside of the permitted range, the coordinate is deemed to have overflowed, and a zero value in bit 0 of overflow register R17 is generated accordingly. Specifically, bit 0 of register R17 is initially set. The contents of register R15 are then subtracted from a value equivalent to the upper range 1023. If the result is negative then a branch is made to an instruction causing bit 0 of register R17 to be cleared. The contents of register R15 are then added to a value corresponding to the lower threshhold (−1024). If the result is negative, the branch to the command to clear bit 0 of register R17 is again effected. A similar sequence is effected with respect to the contents of register R16. Thus, bit 0 of register R17 will be set if both the X coordinate and Y coordinate are within the range −1024 through +1023; if either X or Y has assumed a value outside of the prescribed range, i.e., overflowed, the bit will cleared.

If perspective projections are contemplated, overflow checking would be handled in a slightly different manner. A coordinate would be defined as having overflowed if either the absolute value of its X coordinate or the absolute value of its Y coordinate is greater than its Z-coordinate. An overflow test would selectively clear bit 0 of register R17 in the event of such an overflow.

A determination is then made as to whether or not to move the CRT beam from the previous coordinate to the current coordinate, or to draw a line from the previous coordinate to the present coordinate (step 330). As will hereinafter be explained, the transformed X and transformed Y values (XRTOLD, YRTOLD) and overflow status of the previous endpoint are stored in designated registers R20 and R21, and bit 1 of overflow register R17, respectively. (If perspective projections are contemplated, the transformed Z coordinate of the previous endpoint would also be stored.) A line is drawn only if the move/draw bit for the current coordinate is set and if neither the current coordinate or the previous coordinate has overflowed. The move/draw bit of the first endpoint of the figure to be drawn typically designates a move operation, as opposed to a draw, thus making the initial content of XRTOLD and YRTOLD registers R20 and R21 essentially irrelevant.

More specifically, the move/draw bit of the present endpoint is first tested. The address of the move/draw bit contained in memory pointer register R3 at the end of the transformed coordinate calculation steps (324, 326) is placed on bus 14. The *TAKEMEMADDRESS control signal (NORGATE 221, FIG. 2) is then generated to cause the address to be loaded into latch 22. The contents of memory pointer R3 are then incremented (to designate the X coordinate of the next endpoint). During the next cycle, the move/draw bit in the designated address is tested, and if 0, a "move" operation (step 332) is indicated, and a branch is effected to the initial microcode instruction corresponding to the move operation (step 332). If the move/draw bit is not zero, the overflow bit of the present endpoint (bit 0 of register R17) and the overflow bit corresponding to the previous endpoint (bit 1 of register R17) are each tested in sequence, and if either bit is zero, a branch is effected to the section of the microcode corresponding to the move operation.

If, in step 322, it is determined that no transformation of the coordinate data contained in coordinate memory 20 is desired, i.e., if bit 1 of directive register R1 is 0, the X and Y coordinate values (and Z value if a perspective calculation is contemplated) are fetched from coordinate memory 20, and loaded into XRT register 15 and YRT register 16, respectively (step 334). As previously noted, the speed of line generation may then be increased, without perceivable display degradation, by decreasing the resolution to 11 bits, rather than 12. Accordingly, the contents of registers XRT and YRT are shifted to the right by one bit to form an 11 bit word. A move or draw determination (step 336) is then performed, by inspecting the move/draw bit for the current coordinate. If desired, since no mathematical transformations have been performed on the coordinate, the integrity of the coordinate data can be assumed and the overflow checking step omitted to increase the speed of the determination.

If it is determined in steps 330 or 336, that a move operation is to be effected, a branch is effected to the portion of the microcode corresponding to the move operation (step 332). The "move" operation involves loading the transformed X coordinate (XRT) contained in register R15 into X counter 26 and the transformed Y coordinate (YRT) in register R16 into Y counter 28 for application to DACS 32 and 34. Specifically, the contents of register R15 are placed on bus 14, and the *TAKEXCTR control signal (OR gate 223, FIG. 2) is generated to effect capture of the transformed X coordinate value by X counter 26. During the next cycle period the contents (YRT) of register R16 are placed on bus 14 and the *TAKEYCTR command signal generated to load YRT into Y counter 28. A TAKEDACS control signal (NOR gate 234, FIG. 2) is thereafter generated to load the contents of X counter 26 and Y counter 28 into DACS 32 and 34 respectively. A predetermined count is also loaded into accumulator ACC. The count in accumulator ACC is thereafter counted down to zero to generate a delay to permit the CRT beam to slew to the new coordinate.

If a perspective projection were to be generated, a "move" would be effected by a similar sequence, except the quotient XRT/ZRT would be loaded into X counter 26 and the quotient YRT/ZRT would be loaded into Y counter 28. A simplified perspective division is thereby performed, i.e., points further away (larger Z) appear smaller to the viewer.

If it is determined in either steps 330 or 336 that a draw operation is to be effected, the CRT beam is maneuvered from the previous coordinate reflected in registers R20 and R21 (and, initially, in X counter 26 and Y counter 28) to the present coordinate in accordance with an appropriate line generation algorithm (step 338). More specifically, assuming a non-0 length, the contents of X counter 26 and Y counter 28 are varied to generate a staircase approximation to a straight line. A suitable line generation algorithm is described in Bresenham, J. E., Algorithm For Computer Control Of A Digital Plotter, IBM System Journal 4(1): 25–30 (1965) and in Newman W. M. and Sproull, R. F., Principles of Interactive Computer Graphics, 2d Edition, New York, McGraw Hill (1979), pp. 25–27. The preferred embodiment of system 10 utilizes a modified form of Bresenham's algorithm which will be described in conjunction with FIGS. 4–6. After a move operation (step 332) or a draw operation (step 338) are completed, the coordinate values and overflow status of the present endpoint, i.e., the contents of registers R15 and R16 and bit 0 of register R17 are loaded into registers R20 and R21 and bit 1 of register R17, respectively, to operate as the previous endpoint with respect to the next successive endpoint defined by the contents of coordinate memory 20 (step 340). The transfer of bit 0 of register R17 to bit 1 is suitably effected by an arithmetic shift left operation.

The "lines to be drawn counter" R14 is then decremented (step 342) and then tested to determine if the contents are equal to 0 (step 344). If the contents of counter R14 is non-0, a branch is effected to the microcode instructions corresponding to step 322, i.e., the next successive endpoint in coordinate memory 20 is fetched and processed in the manner described above. This process is continued until R14 is decremented to 0, indicating that the figure is completed, whereupon system 10 resumes the waiting condition (step 302).

In the preferred embodiment of system 10, a modified form of Bresenhem's algorithm is utilized to effect the draw operation (step 338). The algorithm has been modified for increased speed and simplicity when used in connection with a microcoded CPU capable of performing a "branch on negative result" operation during the same cycle in which the result is calculated. More specifically, a normal branch instruction requires 2 microcode states. In the first state, the arithmetic calculation is performed in the CPU and indicators of its result (e.g., whether the result (a) is zero; (b) is negative; (c) overflowed; or (d) generated a carry from its most significant bit) are stored in predetermined bits of a CPU status register. In the second state, bits in the status register are tested and a branch is selectively effected.

However, in a "branch quickly on negative" (BQN) instruction, the negative result indicator is not stored, but rather appears in the same state at the T3 output pin of the CPU and is immediately tested by the branch logic 40. Use of a CPU capable of effecting such a BQN instruction can greatly facilitate the draw operation.

Figure 4:
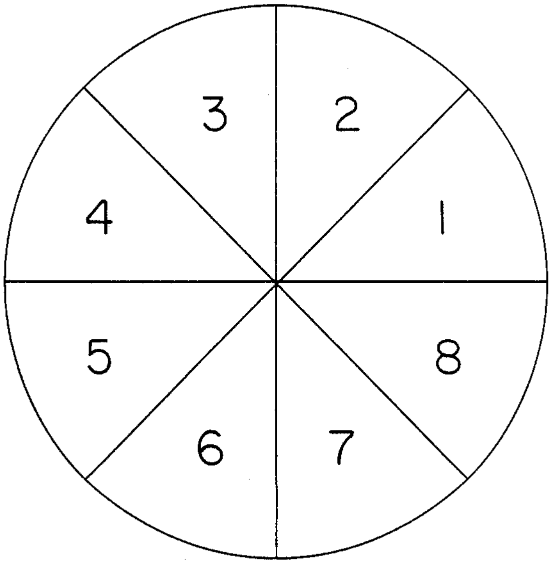
FIG. 4 is a chart indicating the octants in which straight lines can be generated.
Figure 5:
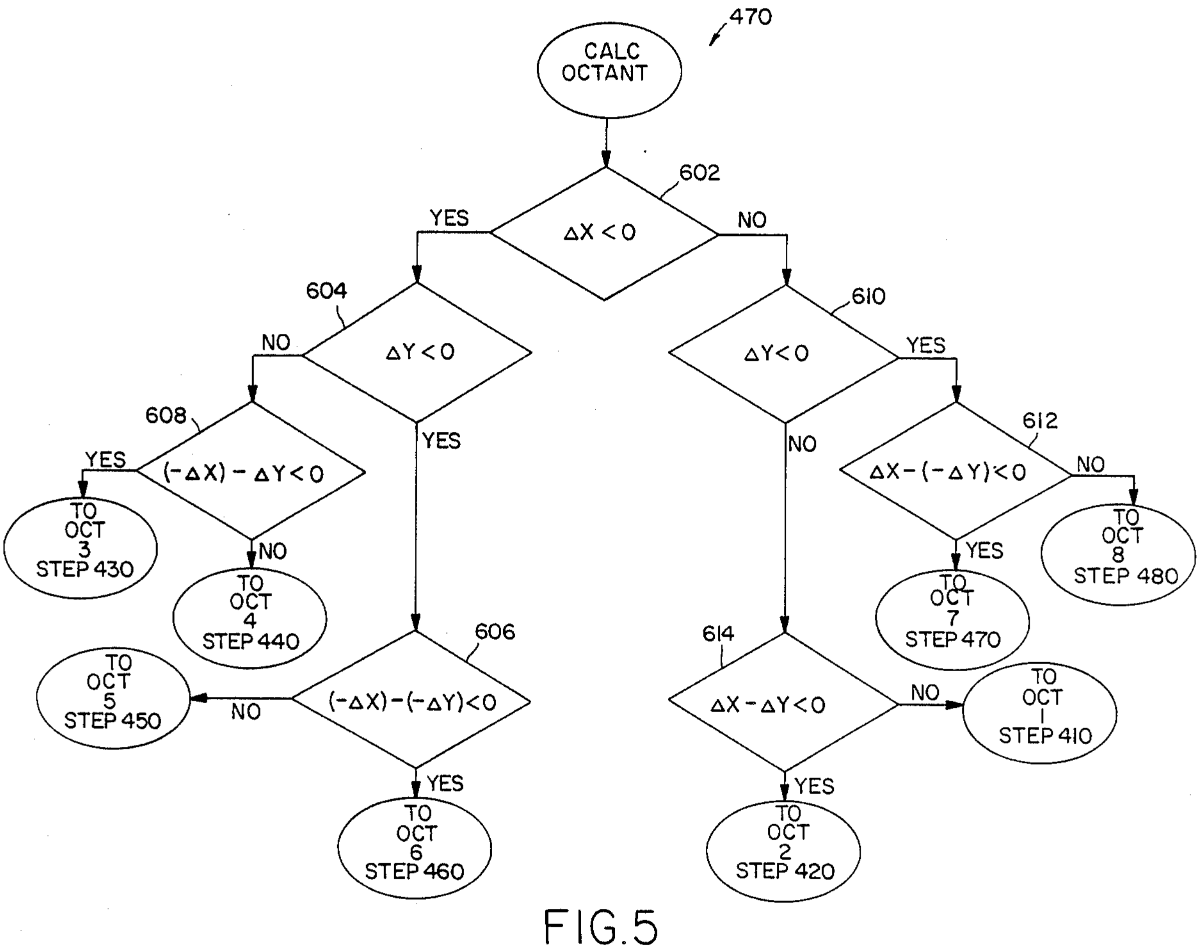
FIG. 5 is a flow chart of a suitable algorithm for determining the octant of a line.
Figure 6A:
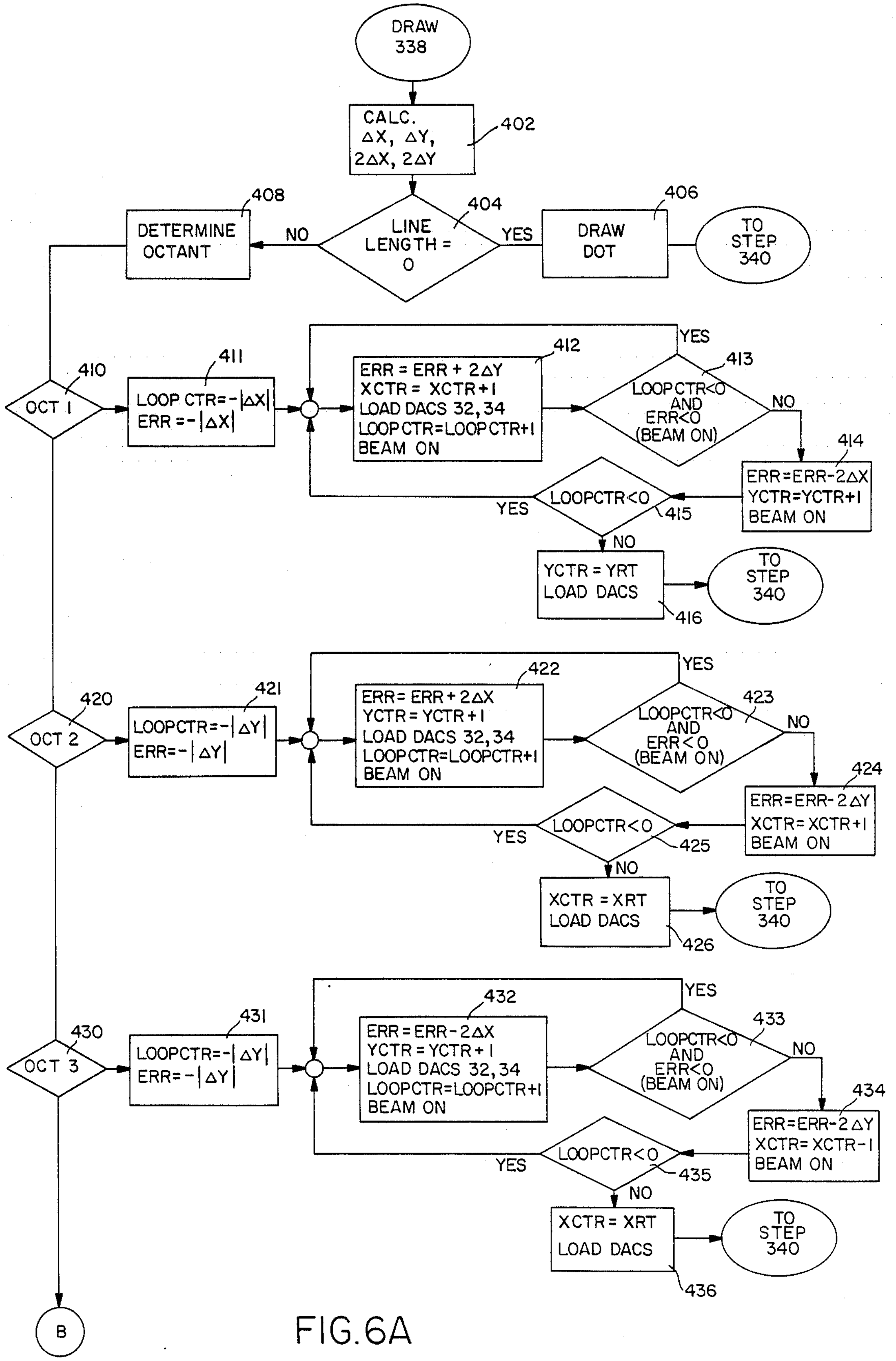
FIGS. 6A and 6B form a flow chart of that part of the microcode which performs line generation.
Figure 6B:
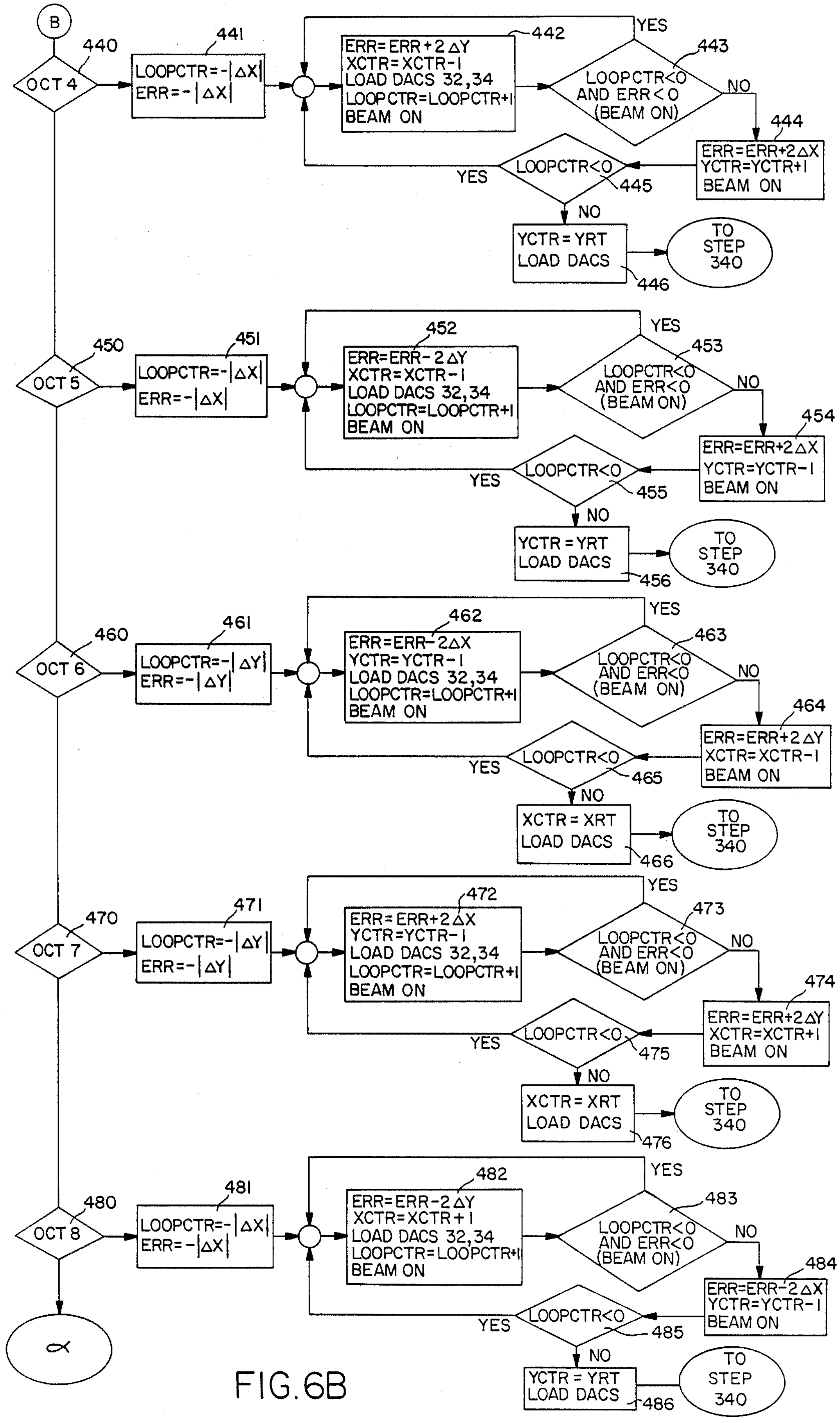

The "draw" operation (step 338) will now be described in conjunction with FIGS. 4, 5, 6A, and 6B. Referring now to FIG. 6A, preliminary calculations required for drawing a line from the previous coordinate to the present (current) coordinate are initially performed (step 402). Specifically, the values for $\Delta X$ (i.e., XRT−XRTOLD), $\Delta Y$ (i.e., YRT−YRTOLD), 2 $\Delta X$ and 2 $\Delta Y$ are calculated and stored in registers R22, R23, R24 and R25, respectively. More particularly, the XRT value in register 15 is first loaded into accumulator ACC. The XRTOLD value in register R20 is then subtracted from the content of accumulator ACC (XRT) and loaded into both registers R22 and R24. Thus each of accumulator ACC and registers R22 and R24 contain, at this point, indicia of $\Delta X$. The contents of register R24 are then shifted by one bit to the left, in effect multiplying the contents of register R24 by two. A similar sequence is then effected with respect to the YRT value in register 16 resulting in accumulator ACC and register R23 containing $\Delta Y$ and register R25 containing 2 $\Delta Y$.

It is sometimes desirable to draw a dot at a particular coordinate (as opposed to a line between two coordinates) or the mathematical transformations may reduce a line's length to zero. Such a dot is, in effect, a line of length 0. Accordingly, to facilitate presentation of dots on the CRT screen, a line length check is performed (step 404). Specifically, the contents of accumulator ACC ($\Delta Y$) and the contents ($\Delta X$) of register R22 are OR'ed and, if the result is equal to 0, a branch is effected to a code sequence corresponding to drawing a dot (step 406). Since the previous and current coordinates are equal, the present coordinate is already manifested in X counter 26, Y counter 28 and DAC's 32 and 34. Accordingly, the CRT beam is turned on at its present location for a predetermined period. Specifically, a predetermined negative number is loaded into accumulator ACC. During successive cycles, the *CRTBEAMON control signal (output Q3 of PROM 36F, FIG. 2) is generated, holding on the CRT beam, until the accumulator has counted up to 0. After the predetermined time period, system 10 proceeds to step 340 as previously described.

If the line has a non-zero length, however, the contents of X counter 26 and Y counter 28 are selectively varied to effect generation of CRT deflection signals to approximate a straight line between the previous coordinate and the current coordinate. (steps 408 et seq.).

The manner in which the contents of X counter 26 and Y counter 28 are varied is a function of the direction of the line to be generated. The CRT screen is nominally divided into octants 1–8 as shown in FIG. 4. The previous coordinate is deemed to be at the center of FIG. 4. The octant in which the line resides is determined (step 408), and a branch is effected to a code sequence corresponding to generation of a line in the particular octant: Octant 1 (steps 410 et seq.); Octant 2 (steps 420 et seq.); Octant 3 (steps 430 et seq.); Octant 4 (steps 440 et seq.); Octant 5 (steps 450 et seq.); Octant 6 (steps 460 et seq.); Octant 7 (steps 470 et seq.); and Octant 8 (steps 480 et seq.).

The octant in which a line resides is determined by the sign and relative magnitude of ΔX and ΔY. Referring briefly to FIG. 5, the octant of the line is determined by first determining the sign of ΔX, contained in register R22 (step 602).

If ΔX is negative, it is clear that a line must reside in octants 3, 4, 5, or 6. Conversely, if ΔX is positive, the line must reside in one of octants 1, 2, 7, or 8. Accordingly, a branch quick on negative operation is effected with respect to the contents of register R22 (ΔX), i.e., if ΔX is negative, a branch is effected to a sequence of microcode instructions for determining in which of octants 3, 4, 5, or 6 the line resides.

Given a negative ΔX, a negative ΔY indicates that the line must reside in one of octants 5 or 6 and a positive ΔY indicates that the line must reside in one of octants 3 or 4. Accordingly, the sign of ΔY is determined (step 604). More specifically, a branch quick on negative operation is effected with respect to the contents of register R23 (ΔY) conditionally designating a sequence of microcode instructions for determining in which of octants 5 and 6 the line resides.

Given negative values for both ΔX and ΔY, if the absolute value of X is greater than the absolute value of ΔY, i.e., $-\Delta X > -\Delta Y$ the line resides in octant 5. Conversely, if the absolute value of ΔY is greater than the absolute value of ΔX, the line resides in octant 6. Accordingly, the relative size of the absolute values of ΔX and ΔY is determined (step 606). More specifically, recalling that ΔX and ΔY are negative, the absolute values of ΔX and ΔY are generated in registers R22 and R23 respectively, by negating the contents thereof. As a result of the preliminary calculations (step 402, FIG. 6A), preceeding determination of the octant, accumulator ACC also contains indicia of ΔY. The absolute value of ΔY is similarly generated in accumulator ACC by negating its contents. The absolute value of ΔY in accumulator ACC is then subtracted from the absolute value of ΔX in register R22, and a branch quick on negative operation is performed, conditionally designating the series of instructions corresponding to generation of a line in octant 6 (step 460 et seq.). If the result is not negative, a microcode sequence corresponding to generation of a line in octant 5 (steps 450 et seq is performed).

If ΔX is negative and ΔY is positive, then the line must reside in one of octants 3 or 4. Accordingly, if it is determined in step 604 that ΔY is not negative, a sequence of instructions is effected to determine in which of octants 3 or 4 the line resides. Specifically, given a negative ΔX and a positive ΔY, if the absolute value of ΔX is less than the absolute value of ΔY, the line resides in octant 3. Conversely, if the absolute value of ΔX is greater than the absolute value of ΔY the line resides in octant 4. Accordingly, the relative size of the absolute values of ΔX and ΔY are determined, and branching effected accordingly (step 608). Specifically, the contents of register R22 (ΔX, a negative value), is negated, to provide in register R22 indicia of the absolute value of ΔX. The contents of accumulator ACC (ΔY, a positive value), and then subtracted from the contents of register R22. A branch quick on negative operation is then effected with respect to the result, conditionally designating the instruction sequence corresponding to generation of an octant 3 line (steps 430 et seq.). If the result is not negative, a sequence of instructions corresponding to generation of an octant 4 line (steps 440 et seq.) is effected.

If ΔX is not less than 0, then the line must reside in one of octants 1, 2, 7, or 8. Given a positive ΔX, a negative ΔY indicates a line in either octant 7 or octant 8, and a positive ΔY indicates a line in either octant 1 or octant 2. Accordingly, if it is determined in step 602 that ΔX is positive, the sign of ΔY is determined (step 610). That is, a branch quick on negative operation is performed with respect to the contents of register R23 (ΔY), conditionally designating a sequence of steps to discriminate between octant 7 and octant 8 lines (step 612). Specifically, given a positive ΔX, and a negative ΔY, if the absolute value of ΔX is greater than the absolute value of ΔY (i.e., $-\Delta Y$), an octant 8 line is indicated. Conversely, if the absolute value of ΔY is greater, the line resides in octant 7. Accordingly, the contents of register R23 (ΔY, a negative value) are negated. Similarly, the contents of accumulator ACC (ΔY, a negative value) are negated. Thus, both register R23 and accumulator ACC are made to contain indicia of the absolute value of ΔY. The contents of accumulator ACC (the absolute value of ΔY) are then subtracted from the contents of register R22 (ΔX, a positive value). A branch quick on negative operation is performed with respect to the result, conditionally designating an instruction sequence corresponding to generation of an octant 7 line (steps 470 et seq.). If the result is not negative, a sequence of steps corresponding to generation of an octant 8 line (step 480 et seq.) is performed.

If, however, both ΔX and ΔY are positive values, the line must reside in octants 1 or 2. If the absolute value of ΔX is greater than that of ΔY an octant 1 line is indicated. If ΔY is greater, an octant 2 line is indicated. Accordingly, the relative magnitudes of ΔX and ΔY is determined (step 614). Specifically, the contents of accumulator ACC (ΔY, a positive value) is subtracted from the contents of register R22 (ΔX, a positive value). A branch quick on negative operation is performed on the result, designating a branch to the instruction sequence corresponding to generation of an octant 2 line (step 420 et seq). If the result is not negative, the sequence of steps corresponding to generation of an octant 1 line (steps 410 et seq.) is performed.

Referring again to FIGS. 6A and 6B, the generation of lines in the respective octants will be described. In general, the negative of the absolute value of one or the other of ΔX or ΔY, in accordance with the octant of the line (e.g., having the largest magnitude) is loaded into loop counter 18. An error term (ERR) representing the difference between the current beam position and the correct theoretical line is calculated (initially the negative of the larger in magnitude of ΔX or ΔY). At the start of the line generation process X counter 26 and Y counter 28 contain the values corresponding to the previous coordinate. During each step of the line generation process thereafter, a predetermined one of X counter 26 or Y counter 28 is incremented or decremented in accordance with the octant, moving the electron beam one unit in the designated direction. The error term is monitored and the other of X counter 26 and Y counter 28 is selectively adjusted (incremented or decremented in accordance with the octant) accordingly. The electron beam is turned on during this process so that the generated line is visibly traced on the CRT screen. With each step, loop counter 28 is incremented toward zero, and the line generation process is halted when the loop counter reaches zero. At this point, X counter 26 and Y counter 28 should contain the values of the current coordinate. (However, an adjustment is sometimes required, as will be explained.) The result of the line generation process is a reasonable staircase approximation to a straight line.

Referring again to FIGS. 6A and 6B, it should be recalled that at the end of octant determination step 408, registers R22 and R23 contain the absolute values of ΔX and ΔY, respectively. When an octant 1 line is to be generated, Loop Counter 18 (FIG. 1) is initially loaded with the negative of the absolute value of ΔX, and, an error term equal to the negative of the absolute value of ΔX is established in accumulator ACC (Step 411). The negative of the contents of register R22 (ΔX) is placed both in accumulator ACC and on bus 14 (FIG. 1). The *TAKELOOPCTR command signal (NOR gate 229, FIG. 2) is generated to effect loading of Loop Counter 18.

DACs 32 and 34 are then loaded, the CRT beam turned on, the error term increased by 2 ΔY and X Counter 26 and Loop Counter 18 each incremented (step 412). More specifically, the contents of register R25 (2 ΔY) are added to the contents of accumulator ACC (ERR) with the result stored in accumulator ACC. The *INCXCTR command signal (OR gate 225, FIG. 2), TAKEDACS command signal (NOR gate 234, FIG. 2), INCLOOPCTR command signal (NOR gate 233, FIG. 2), and the *CRTBEAMON command signal (Output Q3 of PROM 36F, FIG. 2), are also generated during the cycle.

The sign of the contents of Loop Counter 18 and the sign of the error term is then determined (step 413). The BRANCHONLOOPCTRNEGANDN control signal (Output Q0 of PROM 36F, FIG. 2) is generated and applied as an input terminal to AND gate 208. (FIG. 2) The LOOPCTRNEG signal generated by loop counter 18 and the T3 condition output from CPU (at this point indicative of the sign of the error term in accumulator ACC) are similarly applied to AND gate 208. Accordingly, if both the contents of the loop counter and the error term are negative, AND gate 208 generates an output signal ultimately causing State Counter 38 to be loaded with the Branch address (designated by the outputs of PROM 36A (FIG. 2) corresponding to step 412. That is, step 412 is repeated until one or the other of the count in loop counter 18 or the error term become non-negative. When either the count in loop counter 18 or the error term are found to be non-negative, the error term is decreased by 2 ΔX, and the Y Counter incremented (step 414) (the CRT beam is maintained on all the while). That is, the contents of register R24 (2 ΔX) are subtracted from the error term in accumulator ACC, with the result stored in accumulator ACC. The *INCYCTR and *CRTBEAMON command signals (NOR gate 232 and Output Q3 of PROM 36F, respectively, FIG. 2) are also generated during the cycle.

The sign of the contents of loop counter 18 is then tested, and, if found to be negative, step 412 is repeated. (step 415). The BRANCHONLOOPCTRNEG control signal (Output Q3 of PROM 36B, FIG. 2) is generated and Outputs Q0 through Q7 of PROM 36A provide an address corresponding to step 412.

This sequence of steps is continued until the contents of loop counter 18 is found to be non-negative in step 415. At this point, X Counter 26 and Y Counter 28 should contain values corresponding to the present endpoint. However, occasionally, the Y Count will have been incremented once too often. Accordingly, an adjustment is made (step 416). More specifically, the line generation algorithm always ends with a vertical step. Where the line should, in fact, end with a horizontal step rather than a vertical step, Y Counter 28 will have been incremented one time more than appropriate. Accordingly, the Y Counter is loaded with the actual YRT coordinate. The contents of register R16 (YRT) is placed on BUS 14 and the *TAKEYCTR output signal (OR gate 230, FIG. 2) is generated to load Y Counter 28 with the YRT value. At this point, the TAKE DACS signal (NOR gate 234, FIG. 2) is generated and the CRT beam turned off. The system then proceeds to Step 340 as previously described.

Similar procedures effected for lines in the various other octants as shown in FIGS. 4A and 4B.

The algorithm utilized in the preferred embodiment is particularly advantageous in a number of respects. Initialization of the erorr term to the negative of the absolute value of ΔX (or ΔY) avoids time consuming arithmatic operations entailed in the prior art algorithms. Further, fewer logical operations are required (for an octant 1 line, one step each for a horizontal move, and on a selective basis one step each for a vertical move.) In addition, by utilizing a microcoded CPU wherein an arithmatic result can be calculated and the sign of the result sensed in the same CPU state, line generation can be performed in approximately 1.5 states per horizontal move. For example, generation of a line in octant 1, typically ranges from a minimum one state per horizontal move for a line drawn primarily along the X axis (east), to two states per horizontal move for a line approaching quadrant 2(northeast). Further, a decision to increment vertically (in octant 1) is based upon whether a numeric result is negative. This is to be distinguished from an instance in the prior art algorithms where a decision is based upon whether a numeric result is greater than zero. A negative result is detected based upon the testing of only the most significant bit of the result, whereas detecting a positive non-zero result requires testing the entire word. In addition, the error term is adjusted (e.g., steps 412, 414) by the addition or subtraction of a single value. The prior art algorithms involve addition or subtraction of two terms in each step.

It will be understood that while various of the conductors/connections are shown in the drawing as single lines, they are not so shown in a limiting sense and may comprise plural conductors/connections as is understood in the art. Further, the above description is of preferred exemplary embodiments of the present invention, and the invention is not limited to the specific forms shown. For example, special purpose divider hardware can be added to system 10 to facilitate calculation of quotients (X/Z, Y/Z) used in generation of perspective displays. Similarly, dots (i.e., lines of zero length) can be specifically defined to conserve coordinate storage. These and other modifications may be made in the design and arrangement of the elements without departing from the spirit of the invention as expressed in the appended claims.

What is claimed is:

1. A vector graphics system for cooperating with a display, said display having a plurality of actuable elements disposed at predetermined relative coordinates, said system being of the type including: first and second counters for generating first and second coordinate counts; means for generating position signals to selectively address an element at a position display corresponding to said coordinate; actuating means, responsive to control signals applied thereto, for selectively actuating said addressed display element; and line generator means, responsive to coordinate signals indicative of the coordinates of first and second endpoints, for selectively varying said coordinate counts to generate a line in said display between said first and second endpoints, said first and second coordinate counts being initially in accordance with the coordinates of said first endpoint, improved wherein said line generator means comprises:

a third counter;

means for generating, from said endpoint indicia, indicia of the distance between said first and second successive endpoints;

means, cooperating with said actuating means for, in response to a distance value of zero, generating control signals to actuate, for a predetermined time period, the display element at a position corresponding to the contents of said first and second counters;

means for selectively loading into said third counter indicia of the greater of the magnitude of the difference between the first coordinates of said first and second endpoints and the magnitude of the difference between the second coordinates of said first and second endpoints;

means for selectively effecting incremental adjustment of the contents of one of said first or second counters, chosen in accordance with the relative positions of said first and second endpoints, and actuating the display element at the position corresponding to the instantaneous contents of said first and second counter;

means for selectively effecting incremental adjustment of the other of said first and second counters in accordance with deviations from a straight line between said first and second endpoints; and means for selectively decrementing said third counter;

said means for selectively effecting incremental adjustment of said one end of said other of the first and second counters incrementally adjusting said first and second counters until said third counter reaches zero and said first and second counters contain values corresponding to the coordinates of said second endpoint.

2. The system of claim 1 further comprising:

coordinate storage means for storing indicia of a predetermined sequence of endpoints defining a figure; and sequencing means, cooperating with said coordinate storage means, for selectively providing signals in respect of a predetermined number of said endpoints, in said predetermined sequence, as said coordinate signals to said line generator means.

3. The system of claim 2, wherein said sequencing means comprise:

transformation matrix storage means for storing indicia of a transformation matrix;

transformation means, cooperating with said coordinate storage means and said transformation matrix storage means, for selectively generating indicia of transformed coordinates in respect of said endpoints, and providing signals indicative of the transformed coordinates in respect of said endpoints as coordinate signals to said line generator means.

4. The system of claim 3, further comprising:

transformation varying means for selectively changing said transformation matrix in accordance with a selected pattern to cause incremental changes of said transformed coordinates and to cause said line generator means to generate said figure at successively different positions to continuously move said figure on said display.

5. The system of claim 3 further comprising overflow indicator means for selectively inhibiting said line generator means when a coordinate in respect of one of said first and second endpoints is outside of a predetermined range of values.

6. The system of claim 2 wherein said coordinate storage means includes a respective data record corresponding to each of said endpoints, said data records being arranged in an order in accordance with said predetermined sequence of said endpoints defining said figure;

each said data record comprising respective accessible locations corresponding to at least an X-coordinate, Y-coordinate and move/draw indicia indicating the existence of a line in said figure connecting the endpoint with the just previous endpoint in said predetermined sequence.

7. The system of claim 2 further comprising:

means for storing move/draw indicia indicative of connections in said figure between successive endpoints; and means, responsive to said move/data indicia, for selectively loading said first and second connectors with the coordinates of said second endpoint to effect a move on said display from said first to said second endpoint without generating a human perceptible line.

8. The system of claim 7, wherein said sequencing means comprise:

transformation matrix storage means for storing indicia of a transformation matrix;

transformation means, cooperating with said coordinate storage means and said transformation matrix storage means, for selectively generating indicia of transformed coordinates in respect of said endpoints, and providing signals indicative of the transformed coordinates in respect of said endpoints as coordinate signals to said line generator means.

9. The system of claim 8 further comprising:

overflow indicator means, responsive to said coordinate signals, for generating overflow indicia in response to the condition that a coordinate in respect of one of said first and second outputs is outside a predetermined range of values; and means, responsive to said overflow indicia, for selectively loading said first and second counters with predetermined values, in accordance with said overflow indicia and said move/draw indicia.

10. The system of claim 1 wherein said display is a cathode ray tube display, and said means for generating position signals comprises respective digital to analog converters, cooperating with said first and second counters to provide deflection signals to said cathode ray tube.

11. A vector graphics display system, responsive to commands from a host computer system, for generating drive signals to a display, said system comprising:

bus means, receptive of said commands for said host computer, for operatively interconnecting elements connected thereto;

a central processor unit, operatively connected to said bus means, and responsive to microcode instructions applied thereto for coordinating operation of said system by effecting logical and arithmetic operations in response to microcode instructions;

a first counter, operatively connected to said bus means and responsive to command signals applied thereto, for storing indicia of the distance between successive endpoints, and selectively generating indicia of the completion of drawing of a line between said successive endpoints;

coordinate memory means for accessibly storing indicia of the coordinates of a predetermined sequence of endpoinds defining a figure, and move/draw indicia indicative of connections in said figure between successive endpoints, said coordinate memory means being operatively connected with said bus means and responsive to command signals applied thereto;

means for accessibly storing indicia of a transformation matrix;

multiplier-accumulator means operatively connected to said bus means and responsive to command signals applied thereto, for selectively performing matrix multiplication of said endpoint coordinates and said transformation matrix;

a second counter operatively connected with said bus means and responsive to command signals applied thereto, for storing indicia of a current first coordinate of the position of a drawing beam which draws said figure on said display;

a third counter operatively connected with said bus means and responsive to command signals applied thereto, for storing indicia of a current second coordinate of the position of said drawing beam;

means for generating said drive signals, in accordance with the instantaneous contents of said second and third counters; and sequencing logic for generating said microcode instructions to said central processor unit, and said command signals to said first, second and third counters, said coordinate memory means, and multiplier-accumulator means to vary the contents of said second and third contents such that said display manifests said figure as transformed by said transformation matrix.

12. The system of claim 11, wherein said sequencing logic comprises:

a microcode memory, responsive to address signals applied thereto for storing a program of microcode instructions, and providing indicia of an addressed microcode instruction;

command logic, responsive to indicia of said microcode instructions, for selectively generating said command signals to said first, second and third counters said coordinate memory, and said multiplier-accumulator;

a state counter, responsive to increment and load command signals applied thereto, and selectively receptive of indicia of a branch address designated by microcode instructions, for generating said address signals to said microcode memory;

a clock generator for periodically incrementing said state counter; and branch logic, responsive to control signals applied thereto, for selectively generating said load command to said state counter to effect loading of said branch address indicia into said state counter.

13. The system of claim 12, wherein said first counter is decremented in accordance with incremental changes in the contents of said second and third counters, and generates a command signal to said branch logic indicative of the sign of the contents of said loop counter.

14. The system of claim 13, wherein said central processor unit includes means for effecting a branch quickly on negative instruction so that a negative result indicator is directly transmitted to and tested by said branch logic within a single microcode state.

15. The system of claim 12, wherein said microcode instructions comprise a microinstruction portion to be executed by said central processor unit, a system control portion for application to said command logic, and branch command and branch address portions for application to said branch logic.

16. The system of claim 12, wherein the commands from said host computer comprise an op code portion identifying the command and an immediate data value portion, and wherein said system further comprises:

an accumulator register for storing indicia of a host command as it is received from said host computer;

a command register for storing indicia of the op code portion of said host command, said data value portion being retained in said accumulator register;

and means for decoding said op code portion by comparison with prestored host command op codes in said microcode and responsively effecting a branch to a sequence of microcode instructions corresponding to said op code.

17. The system of claim 11, wherein said means for generating drive signals comprises first and second digital-to-analog converters connected to said second and third counters, respectively.

18. The system of claim 17 further comprising a directive register for storing, responsive to a command from said host computer, indicia of a transformation directive for selectively inhibiting operation of said multiplier accumulator.

19. The system of claim 18, wherein said means for storing indicia of said transformation matrix comprises a plurality of transformation matrix storage registers.

20. The system of claim 19, further comprising a matrix pointer register for storing, responsive to a command from said host computer, indicia of an address designating one of said transformation matrix storage registers.

21. The system of claim 20, further comprising a memory pointer register for storing, responsive to a command from said host computer, indicia of an address in said coordinate memory.

22. A method of driving a display having a plurality of actuable elements at predetermined positions in said display, to generate an approximation of a straight line segment on said display, said segment being defined by a first endpoint and a second endpoint, said method comprising the steps of:

(a) providing indicia of the X and Y coordinates of said first and second endpoints;
(b) placing indicia of the X and Y coordinates of said first endpoint in said first and second counters, respectively,
(c) calculating the distance between said second endpoint and said first endpoint;
(d) checking for a distance of zero and branching to a microcode sequence to effect actuation, for a predetermined time period, of the display element at a position corresponding to the contents of said first and second counter if said distance equals zero;
(e) determining in which of eight octants, relative to said first endpoint, said line segment lies on said display;
(f) loading indicia of the greater of the absolute value of the difference between the second and first X coordinates and the absolute value of the difference between the second and first Y coordinates in a third counter;
(g) calculating an error term representing the difference between the instantaneous contents of said first and second counters and a theoretical line between said second and first endpoints;
(h) incrementally adjusting a predetermined one of said X counter and said Y counter according to the octant in which said line segment lies and effecting actuation of the display element at a position corresponding to the contents of said first and second counters;
(i) selectively incrementally adjusting the contents the other of said first and second counters in accordance with said error term to approximate said theoretical straight line;
(j) decrementing said third counter; and
(k) repeating steps (e) through (j) until the contents of said third counter reaches zero and said first and second counters contain the values of said second endpoint coordinates.

23. A vector graphics system for cooperation with a display, said display having a plurality of actuable elements disposed at predetermined relative positions, said system comprising:

means for generating position indicia;
means for generating position signals to select a display element in accordance with said position indicia;
means, responsive to control signals applied thereto, for selectively actuating said selected display element;
coordinate storage means for storing indicia of a predetermined sequence of endpoints defining a figure, and move/draw indicia indicative of connections in said figure between successive endpoints;
transformation matrix storage means for storing indicia of a transformation matrix;
transformation means, cooperating with said coordinate storage means and said transformation matrix storage means, for selectively generating indicia of transformed coordinates in respect of said endpoints;
sequencing means, cooperating with said transformation means, for selectively providing coordinate signals in respect of a predetermined number of said endpoints in said predetermined sequence;
overflow indicator means, responsive to said coordinate signals, generating overflow indicia in response to the condition that a coordinate in respect of one of first and second successive endpoints is outside a predetermined range of values; and
means, responsive to said coordinate signals, said move/draw indicia and said overflow indicia, for controllably varying said position indicia, said means for controllably varying, in accordance with said move/draw indicia and said overflow indicia, alternatively varying said position indicia from a value corresponding to said first endpoint to a value corresponding to said second endpoint in a gradual manner to provide drive signals corresponding to a human perceivable line between said first and second endpoints, or, setting said position indicia to a value corresponding to said second endpoint to select said second endpoint without generating a human perceivable line.

24. The system of claim 23, wherein said display comprises a cathode ray tube, and said means for generating position signals comprises means for generating beam deflection signals to said cathode ray tube.

25. The system of claim 24 wherein said means for controllably varying said position indicia further includes means for setting said position indicia to a value corresponding to said second endpoint to effect a move to said second endpoint without generating a human perceivable line, if overflow indicia is generated in respect of a just previous endpoint in said predetermined sequence.

26. The system of claim 23 wherein said means for controllably varying said position indicia comprises:

a processor, cooperating with said means for generating position indicia and responsive to instruction signals applied thereto; and
sequencing logic, cooperating with said processor and said means for generating position indicia, for selectively generating instruction signals to said processor and operational command signals to said means for generating position indicia.

27. The system of claim 26 further including means, cooperating with said processor and said sequential logic, for generating indicia of completion of a line drawn from the first to the second endpoint.

28. The system of claim 26 wherein said sequencing logic comprises:

a memory, having a plurality of locations, containing indicia of a predetermined sequence of instructions and operational commands;
a loadable counter for designating particular locations in said memory;
branch logic means, responsive to signals indicative of predetermined conditions, for selectively loading indicia of predetermined locations in said memory into said loadable counter; and
means for selectively incrementing said loadable counter.

29. A vector graphics system for cooperation with a display, said display having a plurality of actuable elements disposed at predetermined relative positions, said system comprising:

means for generating position indicia;

means for generating position signals to select a display element in accordance with said position indicia;

means, responsive to control signals applied thereto, for selectively actuating said selected display element;

coordinate storage means for storing indicia of a predetermined sequence of endpoints defining a figure, and move/draw indicia indicative of connections in said figure between successive endpoints;

transformation matrix storage means for storing indicia of a transformation matrix;

transformation means, cooperating with said coordinate storage means and said transformation matrix storage means, for selectively generating indicia of transformed coordinates in respect of said endpoints;

sequencing means, cooperating with said transformation means, for selectively providing coordinate signals in respect of a predetermined number of said endpoints in said predetermined sequence;

line generator means, responsive to coordinate signals indicative of coordinates in respect of first and second successive endpoints and said move/draw indicia, for alternatively effecting a draw operation by varying said position indicia from a value corresponding to said first endpoint to a value corresponding to said second endpoint in a gradual manner to provide drive signals corresponding to a human perceivable line between said first and second endpoints, or a move operation by setting said position indicia to a value coresponding to said second endpoint to select said second endpoint without generating a human perceivable line; and overflow indicator means for selectively inhibiting said draw operation when a coordinate in respect of one of said first and second endpoints is outside of a predetermined range of values.

30. The system of claim 29, wherein said display comprises a cathode ray tube, and said means for generating position signals comprises means for generating beam deflection signals to said cathode ray tube.

31. The system of claim 29 further including means for selectively inhibiting said draw operation when a coordinate in respect of the endpoint in said predetermined sequence just previous to said first endpoint is outside of a predetermined range of values.

32. The system of claim 29 wherein said means for controllably varying said position indicia comprises:

a processor, cooperating with said means for generating position indicia and responsive to instruction signals applied thereto; and sequencing logic, cooperating with said processor and said means for generating position indicia, for selectively generating instruction signals to said processor and operational command signals to said means for generating position indicia.

33. The system of claim 29 further including means, cooperating with said processor and said sequential logic, for generating indicia of completion of a line drawn from the first to the second endpoint.

34. The system of claim 29 wherein said sequencing logic comprises:

a memory, having a plurality of locations, containing indicia of a predetermined sequence of instructions and operational commands;

a loadable counter for designating particular locations in said memory;

branch logic means, responsive to signals indicative of predetermined conditions, for selectively loading indicia of predetermined locations in said memory into said loadable counter; and means for selectively incrementing said loadable counter.

35. The system of claim 29, further comprising:

transformation varying means for selectively changing said transformation matrix in accordance with a selected pattern to cause incremental changes of said transformed coordinates effect generation of said figure at successively different positions to continuously move said figure on said display.

* * * * *